April 20, 1954        H. A. PURSCHE        2,675,749
WHEEL MOUNTED TWO-WAY DISK PLOW
Filed Oct. 21, 1949                  4 Sheets-Sheet 4
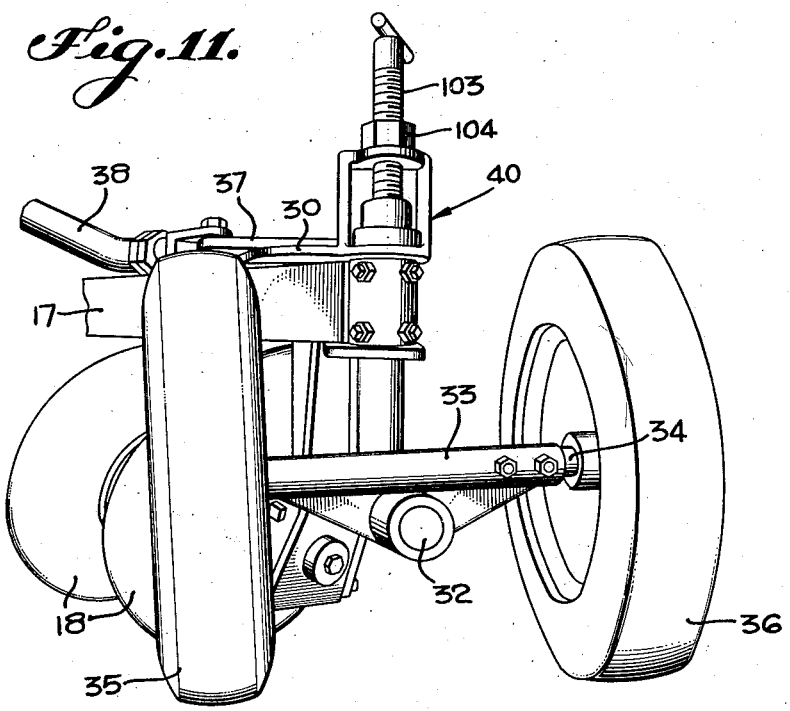
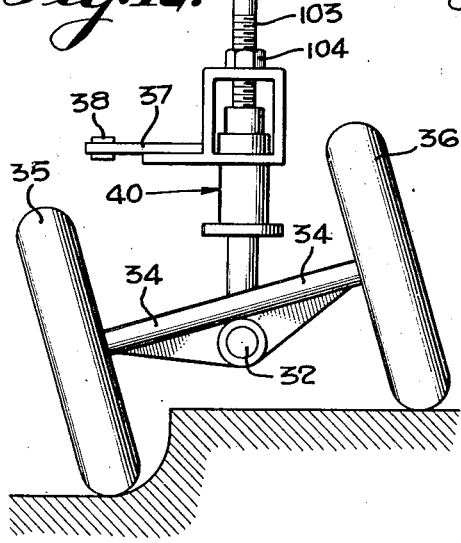
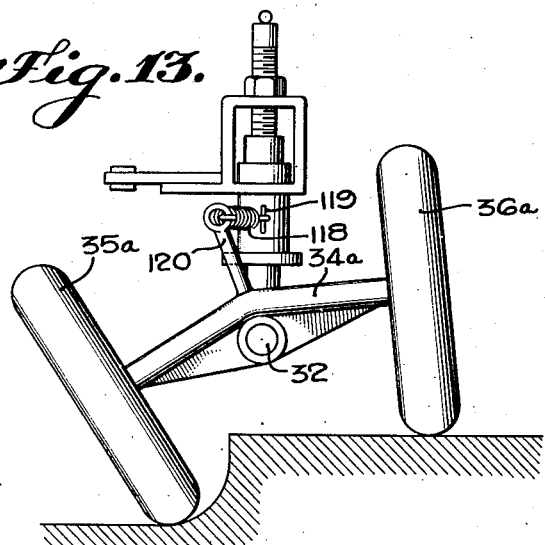
INVENTOR.
HARRY A. PURSCHE
BY
ATTORNEYS.

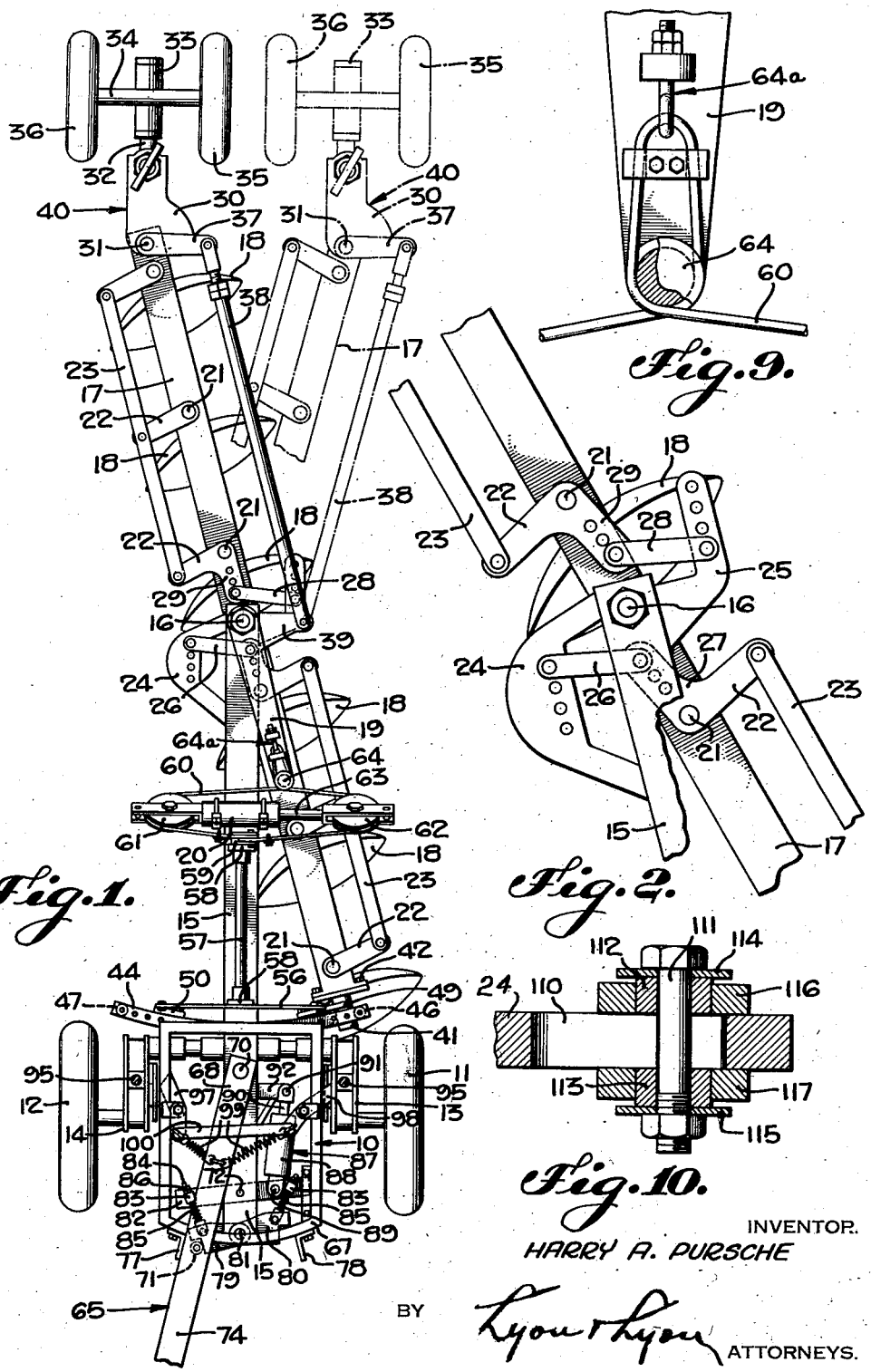

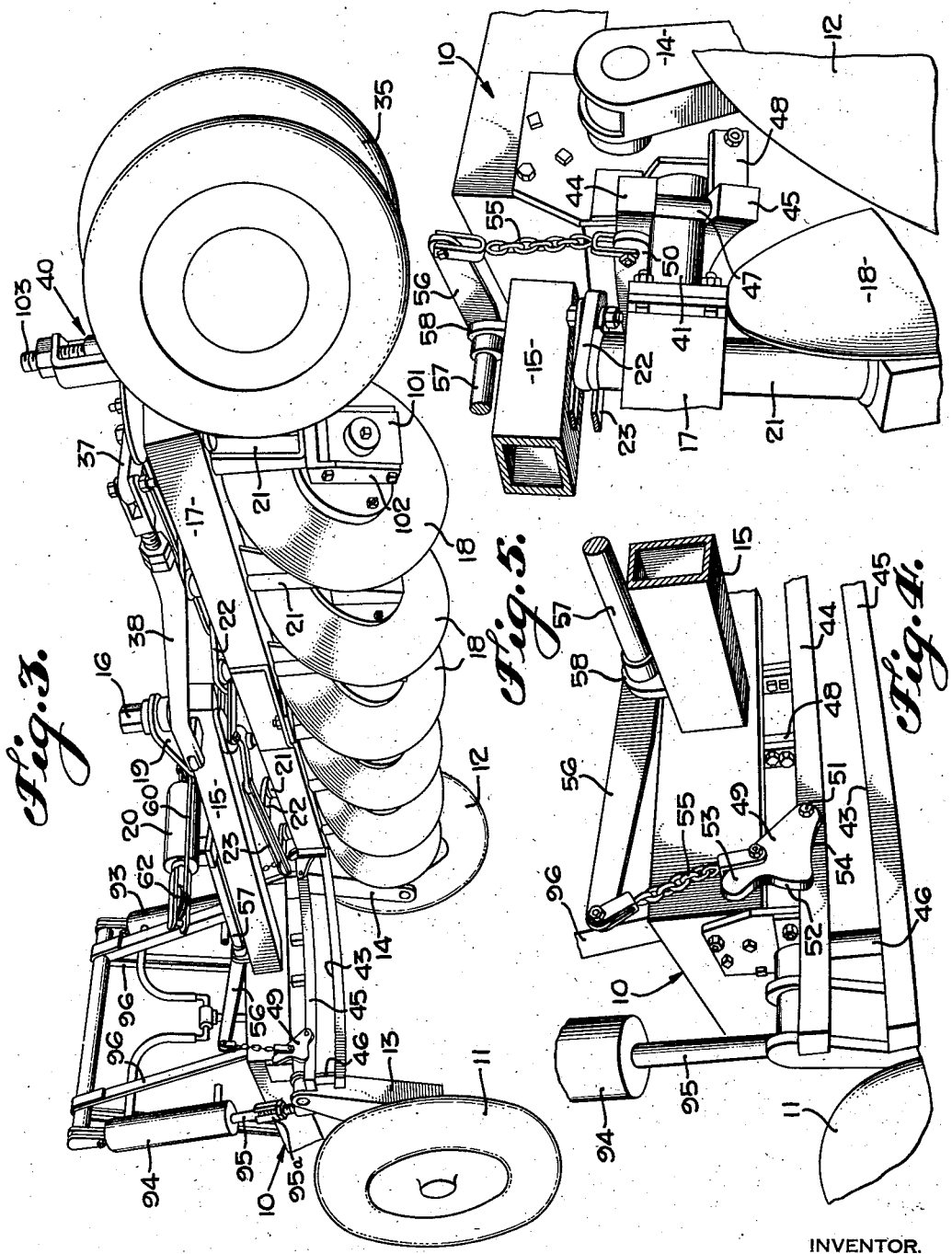

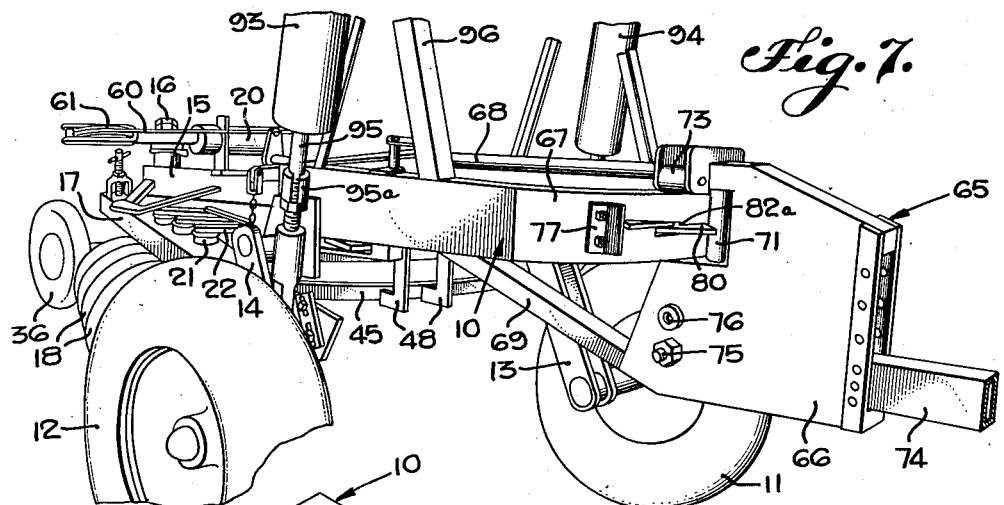
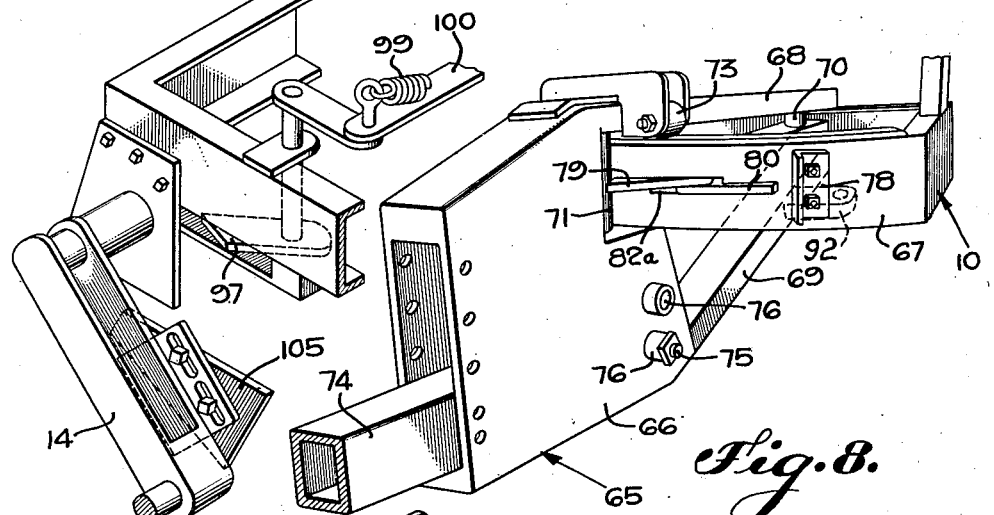
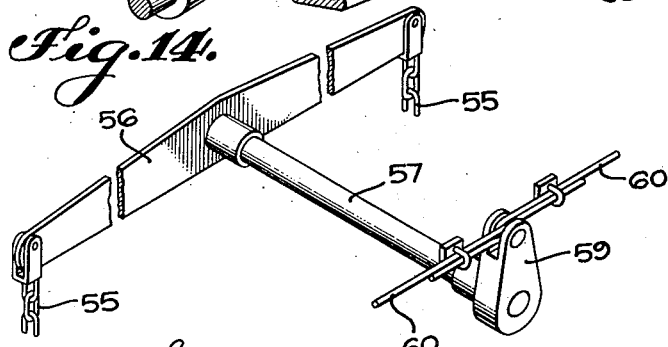

Patented Apr. 20, 1954

2,675,749

UNITED STATES PATENT OFFICE 2,675,749

WHEEL MOUNTED TWO-WAY DISK PLOW

Harry A. Pursche, Gardena, Calif.

Application October 21, 1949, Serial No. 122,729

16 Claims. (Cl. 97—32)

This invention relates to agricultural implements and is particularly directed to an improved form of two-way disk plow.

In my copending application, Serial No. 100,107 now Patent 2,648,267, I have shown a two-way disk plow adapted to be carried on the tractor which pulls it. The present application is directed to an improved form of disk plow which may be supported on a mobile frame so that its weight is not imposed upon the tractor or other towing vehicle.

Among the principal objects of this invention are to provide a gang-type disk plow which can be used in two-way plowing operations by using the same disks to plow both a right-hand furrow and a left-hand furrow.

Another object is to provide a novel tail wheel assembly for minimizing the well known tendency of gang-type disk plows to weave from side to side or "sally," and to overcome this disadvantage so that a straight furrow can be produced.

Another object is to provide a novel form of mobile frame support for a carrier, the carrier being provided with a plurality of plow disks each mounted for pivotal movement relative to the carrier.

Another object is to provide a novel means for swinging the carrier from side to side so that the plow disks may produce a right-hand furrow or a left-hand furrow as desired.

Another object is to provide a device of this type having adjustment means so that the angle of each of the plow disks with respect to the soil being plowed can be varied to compensate for the depth of cut and to compensate for wear on the disks after a period of use.

Other and more detailed objects and advantages will appear hereinafter.

In the drawings:

Figure 1 is a plan view showing a preferred embodiment of my invention, the parts shown in full line being in position for producing a left-hand furrow, the parts shown in phantom lines being in position to form a right-hand furrow.

Figure 2 is an enlarged plan view of a portion of the apparatus shown in Figure 1, the parts being in position for producing a left-hand furrow.

Figure 3 is a perspective view showing the disk plow gang raised out of plowing position.

Figure 4 is a perspective view partly broken away showing details of the latching device for securing the disk plow carrier in either of its operative positions.

Figure 5 is a partial perspective view showing the carrier latched in position to produce a right-hand furrow.

Figure 6 is a schematic perspective view showing operation of the latch-actuating bar from the cable which is used to swing the carrier from side to side.

Figure 7 is a perspective view of the forward portion of the plow assembly showing the mobile frame and the swinging tongue.

Figure 8 is a partial perspective view showing details of the latch mechanism for securing the swinging tongue in either of two operative positions.

Figure 9 is a fragmental plan view showing a preferred form of cable connection for shifting the carrier.

Figure 10 is a sectional elevation showing a modified form of adjustable and pivotal connection between members of the control linkage.

Figure 11 is a perspective view of a preferred form of tail wheel assembly.

Figure 12 is a diagrammatical illustration showing the action of the tail wheel assembly in a furrow.

Figure 13 is a view similar to Figure 12 showing a modified form of tail wheel assembly.

Figure 14 is a perspective view partly broken away showing details of the mechanism for governing the depth of the furrow wheel.

Referring to the drawings, the mobile frame generally designated 10 is carried on side wheels 11 and 12 connected to the frame by means of suitable crank arms 13 and 14. A central beam 15 forms part of the frame and extends longitudinally and rearwardly of the wheels to support a king pin 16. The king pin 16 provides a pivotal support for the carrier 17 which comprises a longitudinal beam extending fore and aft of the king pin and serving as a support for a plurality of ground-engaging disks 18. A crank arm 19 is pivoted on the king pin 16 and is fixed with relation to the carrier 17. A double-acting power cylinder assembly 20 is provided for swinging the arm from side to side and thereby swinging the carrier 17 from the position shown in Figure 1 to the position shown by the phantom lines in the same figure. Each of the disks 18 is carried on a post structure 21 which is pivotally mounted on the carrier 17. Each of the posts 21 is provided with a crank 22, and the cranks are connected by links 23 so that the disks pivot in unison. A stationary bracket 24 is fixed on one side of the central beam 15 and another stationary bracket 25 is fixed on the other side of said beam. A control link 26 connects the stationary bracket with a crank arm 27 formed integrally with one of the arms 22, and similarly, a control link 28 is connected to the bracket 25 and to a crank arm 29 formed integrally with another one of the cranks 22.

It will be observed that the cranks 22 positioned in advance of the king pin 16 extend toward one side of the carrier 17 while the cranks 22 to the rear of the king pin 16 extend to the other side of the carrier 17. From this description it will be understood that swinging movement of the carrier 17 is accompanied by pivotal movement of each of the disks 18.

In accordance with my invention a tail wheel assembly is carried at the rear end of the swinging carrier 17. The assembly includes a mounting bracket 30 pivotally connected to the carrier 17 at 31 and provided with a rearwardly extending shaft 32. A sleeve 33 is mounted to turn on the shaft 32, and this sleeve carries a pair of axles 34 fixed thereto. Wheels 35 and 36 are mounted on the extending ends of the axles 34. One of these wheels rolls in the furrow while the other rolls on unplowed ground. A crank arm 37 fixed with respect to the mounting bracket 30 is connected by means of an adjustable link 38 to a stationary projection 39 fixed on the beam 15 above the level of the bracket 25. The function of the link 38, projection 39 and crank 37 is to pivot the tail wheel assembly generally designated 40 with respect to the carrier 17 so that regardless of the position of the carrier the wheels 35 and 36 are positioned to roll forward in the same general direction as the frame supporting wheels 11 and 12.

A forward extending projection 41 is secured to the forward end of the carrier 17 by bolts 42, and this projection 41 travels in a curved slot 43 formed between the arcuate rails 44 and 45. Limit stops 46 and 47 are adjustably positioned near the ends of the arcuate rails 44 and 45 to limit the travel of the projection 41 in the slot 43. The rails 44 and 45 are fixed to the frame 10 by suitable attachment brackets 48. Means are provided for latching the projection 41 in a position adjacent either of the limit stops 46 and 47, and as shown in the drawings this means includes the gravity-actuated latch lugs 49 and 50 each pivotally connected to the upper rail 44 by means of pivot bolts 51. Each latch lug 49, 50 is provided with an abutment surface 52 adapted to engage one side of the projection 41, and is also provided with a lip 53 which rests on the projection 41. A lower surface 54 on each latch lug is adapted to be contacted by the swinging projection 41 to deflect the latch lug out of the way so that the projection 41 may engage the adjacent limit stop 46, 47.

Chains 55 are provided for raising each of the latch lugs 49 and 50 from latching position, and these chains are connected to opposite ends of a crossbar 56 fixed on one end of the rockshaft 57. The rockshaft 57 is turnably supported in spaced bearings 58 carried on the longitudinal beam 15. A crank 59 is fixed on the rear end of the rockshaft 57 for turning it, and this crank 59 is connected to the ends of a flexible cable 60 operated by the power cylinder assembly 20. The cable 60 passes over sheave pulleys 61 and 62 carried on opposite ends of the double-ended piston rod 63 and passes around knob 64 intermediate its ends. A tightener screw assembly 64a on the forward end of the carrier control crank 19 takes any slack out of the cable 60. From this description it will be understood that when the power cylinder assembly 20 is energized so that the double-ended piston rod 63 extends sheave pulley 62 and retracts sheave pulley 61, the rockshaft 57 is turned so that the cross-bar 56 lifts latch lug 50 away from latching position. At the same time the carrier control crank 19 swings the carrier 17 to the right as shown by the phantom lines in Figure 1 so that the projection 41 deflects the latch lug 49 and engages the limit stop 46. The latch lug 49 then drops by gravity behind the projection 41 and thereby latches the projection in position. Similarly, movement of the double-ended piston rod 63 to extend sheave pulley 61 and retract sheave pulley 62 turns the rockshaft 57 in a direction so that the cross-bar 56 lifts the latch lug 49. The crank 19 then swings the carrier 17 until the projection 41 is latched against the limit stop 47.

The rails 44 and 45 which extend above and below the projection 41 serve to brace the forward end of the carrier 17 and hence relieve the king pin 16 of much of the twisting forces which would otherwise be imposed upon it by the action of the plow disks 18 in the ground.

The frame 10 is provided with a swinging tongue generally designated 65. The tongue 65 includes a box section 66 adjacent the curved forward cross-beam 67 on the frame 10. Upper and lower channel sections 68 and 69 are rigidly secured to the box section 66 and to a vertical pivot pin 70 extending through the longitudinal beam 15. A vertical roller 71 is carried on the box section 66 and rolls in front of the curved front face of the cross-beam 67 along the bumper shoes 79 and 80. Horizontal rollers 73 may also be provided upon the box section 66, and these rollers roll along the upper surface of the cross-beam 67. The tongue 65 also includes a draft element 74 which may be pivotally connected by a horizontal pin 75 extending through any pair of several aligned apertures 76 provided on the box section 66. The draft element 74 extends forwardly for connection to a tractor or other towing vehicle, not shown.

Means are provided for latching the tongue 65 in either of two positions relative to the frame 10. Limit stops 77 and 78 are adjustably secured upon the front face of the curved cross-beam 67. The bumper shoes 79 and 80 are mounted on a common pivot 81 on the longitudinal beam 15, and these bumper shoes may be projected through a slot 82a in the cross-beam 67. A latch bar 82 is pivoted at 72 on the beam 15. An eye 83 is pivotally mounted on each end of the latch bar 82, and each eye receives a rod 84 which is pivoted to one of the bumper shoes 79, 80. A compression spring 85 encircles each rod 84 and bears against one side of the eye 83. Lock nuts 86 on the rod 84 bear against the other side of the eye. When the latch bar 82 swings in one direction, one of the springs resiliently projects one of the bumper shoes 79, 80 and the other bumper shoe is positively retracted. At the same time, vertical roller 71 engages the projecting bumper shoe.

A power cylinder assembly generally designated 87 includes a cylinder 88 pivotally connected at 89 to the latch bar 82, and a piston rod 90 which is pivotally connected at 91 to the tongue-shifting crank 92. When the power cylinder assembly 87 is energized to retract the piston rod 90, the tongue 65 is turned to the position shown in Figure 1 and latched there by the bumper shoe 79 acting in compression. When the power cylinder assembly 87 projects the piston rod 90, the tongue 65 is shifted to the position shown in Figure 7 and latched there by the bumper shoe 80. The bumper shoes 79 and 80 both engage the vertical roller 71.

Power means are provided for raising the frame 10 relative to the wheels 11 and 12. As shown in the drawings, this means includes the power cylinder assemblies 93 and 94, each having a piston rod 95 pivotally connected to one of the wheel arms 13 and 14. Adjustable stop elements 95a are threaded on the lower portion of each piston rod for adjusting the limit of retraction of the rods, and hence regulating the depth of the furrow. An A frame structure 96 on the mobile frame 10 supports the upper ends of the power cylinder assemblies 93 and 94. When the piston rods 95 are projected, the frame 10, beam 15, carrier 17, plow disks 18 and tail wheel assembly 40 are all raised clear of the ground. When the piston rods are retracted, the parts descend under hydraulic force supplemented by gravity.

Swinging stops 97 and 98 are pivotally mounted upon the frame 10 for limiting the angular travel of the arm of the furrow wheel in order to keep the frame 10 substantially horizontal. These stops 97 and 98 are actuated by springs 99 and tie bar 100 in accordance with swinging movement of the tongue 65. The stops 97 and 98 are preferably of the type set forth in detail in my copending application for "Two-Way Plow Construction," Serial No. 109,090, filed August 8, 1949, now Patent 2,655,851. The stops are each engaged by a clip 105 adjustably bolted to each of the wheel arms 13 and 14. The adjustment feature is important since it enables the operator to change the position of the furrow wheel with respect to the frame to compensate for wear on the disk blades.

The adjustments provided by the series of holes in the stationary brackets 24 and 25 allow the plow disks to be adjusted the proper angle with respect to the swing of the carrier 17. Furthermore, each of the plow disks 18 may be adjusted about a horizontal axis by moving the bearing box 101 between the parallel sides 102 of the post 21. The height of the tail wheel assembly 40 with respect to the carrier 17 may be adjusted by means of the adjusting screw 103 and lock nut 104. As shown diagrammatically in Figure 12, one of the wheels of the assembly rolls in the furrow while the other rolls on the unplowed ground. When the carrier 17 is shifted the position of the tail wheel reverses; each wheel alternately rolls in the furrow and then on unplowed ground. Both wheels 35 and 36 serve to minimize irregular lateral shifting of the plow assembly or "sallying," and hence enable the tractor operator to plow a straight furrow. In the modified form of tail wheel assembly shown in Figure 13, the wheels 35a and 36a toe in at the bottom so that the furrow wheel bears against both the bottom and side wall of the furrow to further enhance the ability of the tail wheel assembly to minimize "sallying."

Means may be provided for swinging the tail wheel assembly 40 to a neutral position whenever both of the tail wheels are lifted clear of the ground. As shown in Figure 13, this means may comprise a coil spring 118 secured to the assembly at 119 and to the front end of an arm 120 attached to the axles 34a. Whenever the axles 34a swing about the pivot shaft 32 from a neutral position the spring 118 is extended. Accordingly, when the wheels are lifted clear of the ground the spring 118 serves to return the tail wheels to a neutral position so that a minimum amount of rotary motion about the pivot shaft 32 is occasioned when the wheels re-engage the ground surface.

The power cylinder assemblies 20, 87, 93 and 94 are preferably hydraulically actuated from a pump and valve assembly mounted on the towing vehicle, not shown. The various hydraulic lines are omitted from the drawings for clarity of illustration.

It is highly desirable that the plow disks 18 near the rear end of the carrier 17 enter the ground before the disks near the forward end of the carrier in order that a furrow shall be formed immediately for one of the tail wheels 35, 36 to roll in. The plow is thus stabilized against sidewise movement. If the forward plow disks 18 were to engage the ground first, no furrow would be present for one of the tail wheels 35, 36 to roll in, and hence the plow assembly would swing to one side. The device embodying my invention and shown in the drawings accomplishes the function desired because of the weight of the tail wheel assembly 40 and because the power cylinder assemblies 93 and 94 are connected to the same hydraulic circuit. When the carrier 17 is in the position shown in Figure 3 the power cylinder assembly 94 is more heavily loaded than the power cylinder assembly 93 because of the off-center weight imposed by the tail wheel assembly 40. Consequently, when pressure in the hydraulic circuit is relaxed to lower the frame 10 the crank arm 13 moves before the crank arm 14 moves, and hence the frame 10 tilts and the rear disks 18 enter the ground first.

In Figure 10 I have shown a modified form of pivotal connection for the linkage elements which may be adjusted along a crank with precision. Instead of the series of holes in the members 24, 25, 27 and 29 as shown in Figures 1 and 2, I provide a slot 110. A pivot bolt 111 extends through the slot 110 and through bushings 112 and 113 and washers 114 and 115. The pivot bolt clamps the bushings 112 and 113 at any desired position along the slot 110, and the links 116 and 117 turn freely upon the bushings.

Having fully described my invention, it is to be understood that I do not wish to be limited to the details herein set forth, but my invention is of the full scope of the appended claims.

I claim:

1. In a two way disk plow assembly, the combination of a mobile frame having a central longitudinal beam extending from the rear thereof, a swinging carrier provided with a gang of ground engaging plow disks, each of the plow disks being carried on a post pivotally mounted on the carrier, vertical pivot means connecting the rear end of the beam to a central portion of the carrier, linkage means connecting said posts and said longitudinal beam so that swinging movement of the carrier causes the posts to turn in unison, power means on the frame for raising the beam and carrier to lift the plow disks clear of the ground, and independent power means for swinging the elevated carrier about said pivot means.

2. In a two way disk plow assembly, the combination of a mobile frame having a central longitudinal beam extending from the rear thereof, a swinging carrier provided with a gang of ground engaging plow disks, each of the plow disks being carried on a post pivotally mounted on the carrier, vertical pivot means connecting the rear end of the beam to a central portion of the carrier, linkage means connecting said posts and said longitudinal beam so that swinging movement of the carrier causes the posts to turn in unison, power means on the frame for raising the beam and carrier to lift the plow disks clear of the ground, and bracing means on the frame adapted to engage an element on the forward end of the carrier.

3. In a two way disk plow assembly, the combination of a mobile frame having a central longitudinal beam extending from the rear thereof, a swinging carrier provided with a gang of ground engaging plow disks, each of the plow disks being carried on a post pivotally mounted on the carrier, pivot means connecting the carrier to the rear end of the beam for substantially horizontal swinging movement, linkage means connecting said posts and said longitudinal beam so that swinging movement of the carrier causes the posts to turn in unison, power means on the frame for raising the beam and carrier to lift the plow disks clear of the ground, bracing means on the frame adapted to engage an element on the forward end of the carrier, and a ground engaging tail wheel assembly at the rear end of the carrier.

4. In a two way disk plow assembly, the combination of a mobile frame having a central longitudinal beam extending from the rear thereof, a swinging carrier provided with a gang of ground engaging plow disks, each of the plow disks being carried on a post pivotally mounted on the carrier, pivot means connecting the carrier to the rear end of the beam for substantially horizontal swinging movement, linkage means connecting said posts and said longitudinal beam so that swinging movement of the carrier causes the posts to turn in unison, power means on the longitudinal beam for swinging the carrier about said pivot means, and means actuated by the power means for latching the carrier in either of two positions relative to said frame.

5. In a two way disk plow assembly, the combination of a mobile frame having a central longitudinal beam extending from the rear thereof, a swinging carrier provided with a gang of ground engaging plow disks, each of the plow disks being carried on a post pivotally mounted on the carrier, vertical pivot means connecting the rear end of the beam to a mid-point of the carrier, linkage means connecting said posts and said longitudinal beam so that swinging movement of the carrier causes the posts to turn in unison, bracing means on the frame adapted to engage an element on the forward end of the carrier, a ground engaging tail wheel assembly at the rear end of the carrier, power means on the longitudinal beam for swinging the carrier about said pivot means, and means actuated by the power means for latching the carrier in either of two positions relative to said frame.

6. In a two way disk plow assembly, the combination of a mobile frame having a central longitudinal beam extending from the rear thereof, a swinging carrier provided with a gang of ground engaging plow disks, vertical pivot means connecting the rear end of the beam to a central portion of the carrier, power means for swinging the carrier about said pivot means, bracing means on the frame adapted to engage an element on the forward end of the carrier, and a ground engaging tail wheel assembly at the rear end of the carrier, said assembly including a pair of ground wheels pivotally supported so that either may roll in a furrow while the other rolls on unplowed ground.

7. In a two way disk plow assembly, the combination of a mobile frame having a pair of ground wheels individually movable to raise the frame, a central longitudinal beam extending from the rear of the frame, a swinging carrier provided with a gang of ground engaging plow disks, pivot means connecting the carrier to the rear end of the beam for substantially horizontal swinging movement, a ground engaging tail wheel assembly at the rear end of the carrier, separate hydraulic power cylinder assemblies on the frame for lowering each of said wheels with respect to the frame whereby the carrier and plow disks may be raised clear of the ground, a single pressure line for supplying hydraulic fluid to both said hydraulic power cylinder assemblies, the weight of the tail wheel assembly at the end of the carrier being effective to cause one of the power cylinder assemblies to relax before the other and cause tilting of the frame when pressure is relaxed in said hydraulic line, whereby the plow disks adjacent the tail wheel assembly may enter the ground first.

8. In a two way disk plow assembly, the combination of a mobile frame having a central longitudinal beam extending from the rear thereof, ground wheels on opposite sides of the frame, a swinging carrier provided with a gang of ground engaging plow disks, vertical pivot means connecting the rear end of the beam to a mid-point of the carrier, a ground engaging tail wheel assembly at the rear end of the carrier, power means on the longitudinal beam for swinging the carrier about said pivot means, power cylinder assemblies for moving each of the ground wheels independently to elevate the frame and carrier, a common pressure line for supplying both assemblies with pressure fluid, the weight of the tail wheel assembly being effective to cause one of the power cylinder assemblies to relax before the other when pressure is relaxed in said hydraulic line, whereby the plow disks adjacent the tail wheel assembly may enter the ground first.

9. In a two way disk plow assembly, the combination of a mobile frame having a central longitudinal beam extending from the rear thereof, a swinging carrier provided with a gang of ground engaging plow disks, pivot means connecting the carrier to the rear end of the longitudinal beam for substantially horizontal swinging movement, arcuate members on the frame defining a curved slot therebetween, a projection on the carrier adapted to travel in said curved slot, and latch means for securing the carrier projection at either end of said curved slot, said means including adjustable limit stops defining the ends of the curved slots, and a gravity actuated latch lug movably mounted on one of the arcuate members near each of said limit stops.

10. In a two way disk plow assembly, the combination of a mobile frame having a central longitudinal beam extending from the rear thereof, a swinging carrier provided with a gang of ground engaging plow disks, pivot means connecting the carrier to the rear end of the longitudinal beam for substantially horizontal swinging movement, latch means for securing the carrier in one of two positions relative to the frame, said means including a pair of gravity actuated latch lugs movably mounted on the frame, a rockshaft turnably supported upon said longitudinal beam, power means for swinging the carrier about said pivot means and for turning the rockshaft, a cross-bar fixed to the rockshaft, and flexible elements connecting each end of the cross-bar to one of the latch lugs, whereby either of the latch lugs may be lifted from latching position upon turning movement of the rockshaft.

11. In a two way disk plow assembly, the combination of a mobile frame having a central longitudinal beam extending from the rear thereof, a swinging carrier provided with a gang of ground engaging plow disks, pivot means connecting the carrier to the rear end of the longitudinal beam for substantially horizontal swinging movement, arcuate members on the frame defining a curved slot therebetween, a projection on the carrier adapted to travel in said curved slot, and latch means for securing the carrier projection at either end of said curved slot, said means including adjustable limit stops defining the ends of the curved slots, a gravity actuated latch lug movably mounted on one of the arcuate members near each of said limit stops, a rockshaft turnably supported upon said longitudinal beam, power means for swinging the carrier about said pivot means and for turning the rockshaft, a cross-bar fixed to the rockshaft, and flexible elements connecting each end of the cross-bar to one of the latch lugs, whereby either of the latch lugs may be lifted from latching position upon turning movement of the rockshaft.

12. In a two way disk plow assembly, the combination of a mobile frame having a central longitudinal beam extending from the rear thereof, a swinging carrier provided with a gang of ground engaging plow disks arranged to plow either a left hand furrow or a right hand furrow, pivot means connecting the carrier to the rear end of the longitudinal beam for substantially horizontal swinging movement, a ground engaging tail wheel assembly connected to the rear of the carrier and provided with a pivot shaft, a linkage means connecting the tail wheel assembly and the longitudinal beam for maintaining the pivot shaft aligned in the direction of travel of the mobile frame, a pair of ground wheels carried on the pivot shaft, one of the wheels being positioned to roll in a right hand furrow and the other in a left hand furrow, each of the wheels rolling on unplowed ground when the other rolls in its furrow.

13. In a two way disk plow assembly, the combination of a mobile frame having a central longitudinal beam extending from the rear thereof, a swinging carrier provided with a gang of ground engaging plow disks arranged to plow either a left hand furrow or a right hand furrow, pivot means connecting the carrier to the rear end of the longitudinal beam for substantially horizontal swinging movement, a ground engaging tail wheel assembly connected to the rear of the carrier and provided with a pivot shaft, linkage means connecting the tail wheel assembly and the longitudinal beam for maintaining the pivot shaft aligned in the direction of travel of the mobile frame, a pair of ground wheels carried on the pivot shaft, the wheels being toed in at the bottom, one of the wheels being positioned to roll in a right hand furrow and the other in a left hand furrow, each of the wheels rolling on unplowed ground when the other rolls in its furrow.

14. In a two way plow assembly, the combination of a mobile frame, a carrier turnably mounted on the frame and having ground engaging plow means adapted to form either a right hand or a left hand furrow, a draft tongue, pivot means connecting the draft tongue to the frame whereby the tongue may have substantially horizontal swinging movement relative to the frame, means for latching the tongue to the frame in either of two positions, the latch means including a pair of latch lugs pivotally mounted on the front portion of the frame, each of the lugs being movable between a retracted inoperative position behind said front portion to an extended operative position in front of it, each of the latch lugs in operative position engaging an element of the tongue and acting in compression to latch the tongue against pivotal movement, and power means for shifting the tongue and actuating said latch lugs.

15. In a two-way plow assembly, the combination of: a mobile frame having a central longitudinal beam member extending from the rear thereof, a carrier member turnably mounted on the beam member and having ground-engaging plow means adapted to form either a right-hand or a left-hand furrow, a ground-engaging tail wheel assembly turnably mounted on one of the members, power means on the frame for raising the beam member and carrier member to lift the plow means and tail wheel assembly clear of the ground, the assembly including a pair of ground wheels, one of the wheels being positioned to roll in a right-hand furrow and the other in a left-hand furrow, each of the wheels rolling on unplowed ground when the other rolls in a furrow, and resilient means acting to turn the assembly relative to said member to bring the wheels to a neutral position with respect thereto.

16. In a two-way plow assembly, the combination of: a mobile frame having a central longitudinal beam member extending from the rear thereof, a swinging carrier pivotally connected to the beam member and having a plurality of ground-engaging plow disks adapted to form either a right-hand or a left-hand furrow, an element turnably mounted on the rear of the carrier for movement about a substantially vertical axis and having a rearwardly extending shaft, a sleeve mounted to turn on the shaft, a pair of laterally spaced wheels carried by the sleeve, one of the wheels being positioned to roll in a right-hand furrow and the other in a left-hand furrow, each of the wheels rolling on unplowed ground while the other rolls in a furrow, an upright arm fixed on the sleeve, and means including a spring attached to the arm acting to turn the sleeve about the shaft to bring the wheels to a neutral position.

References Cited in the file of this patent

UNITED STATES PATENTS

| Number | Name | Date |
| --- | --- | --- |
| 816,518 | Wiard | Mar. 27, 1906 |
| 954,950 | Fowler | Apr. 12, 1910 |
| 971,157 | Smith | Sept. 27, 1910 |
| 987,477 | McKay | Mar. 21, 1911 |
| 1,149,720 | Brown | Aug. 10, 1915 |
| 1,165,267 | McKay | Dec. 21, 1915 |
| 1,437,294 | Dowdy | Nov. 28, 1922 |
| 1,491,884 | Puech | Apr. 29, 1924 |
| 1,545,793 | Puech | July 14, 1925 |
| 1,908,095 | York | May 9, 1933 |
| 1,915,844 | York | June 27, 1933 |
| 2,041,216 | Sjogren | May 19, 1936 |
| 2,084,629 | Coviello | June 22, 1937 |
| 2,163,832 | Coviello | June 27, 1939 |
| 2,202,348 | Leach | May 28, 1940 |
| 2,303,320 | Benjamin | Dec. 1, 1942 |
| 2,561,032 | Onfrey | July 17, 1951 |

FOREIGN PATENTS

| Number | Country | Date |
| --- | --- | --- |
| 366,798 | Germany | Jan. 13, 1923 |
| 1,265 | Great Britain | of 1874 |
| 4,453 | Great Britain | of 1875 |
| 1,895 | Sweden | Oct. 26, 1889 |